3,095,389
NATURAL AND SYNTHETIC ALCOHOL SOLUBLE RESIN WITH OTHER SYNTHETIC COPOLYMERS FOR COATINGS
Albert C. Mueller, Berkeley, and Roy W. H. Tess, Orinda, Calif., assignors to Shell Oil Company, a corporation of Delaware
No Drawing. Filed June 30, 1958, Ser. No. 745,291
12 Claims. (Cl. 260—8)

This invention relates to new resinous compositions. More particularly, the invention relates to new resinous compositions containing alcohol soluble resins, such as shellac, and a new type of resinous additive, and to the use of the new products, particularly in the preparation of coating compositions.

Specifically, the invention provides new and particularly useful compositions comprising a mixture of an alcohol soluble coating resin, and preferably shellac, and a new synthetic resinous polyol consisting of a copolymer of an ethylenically unsaturated monohydric alcohol and an alkenyl-substituted aromatic compound, such as, for example, a copolymer of allyl alcohol and styrene, and/or a hydroxy-containing derivative of the said copolymer. The invention further provides new coating compositions, such as lacquers, varnishes and paints, containing the above-described new resinous compositions.

Many alcohol soluble resins, such as shellac, Manilla gum and the like are used in the preparation of surface coating compositions. These coatings, however, have been found to have certain defects, such as poor water resistance, lack of durability and oftentimes relatively slow drying rates. Some of these coatings also have a tendency to blush to yellow and are deficient in gloss and hardness and develop orange peel (i.e., a type of rough surface) on drying. Attempts have been made heretofore to upgrade these coatings by the addition of various synthetic resins. It has been found, however, that most of the new synthetic resins are not alcohol soluble and form incompatible films in combination with the spirit soluble resins. Further, the synthetic resin additives that are soluble in the alcohol fail to impart many of these desired properties.

It is an object of the invention, therefore, to provide new resinous compositions. It is a further object to provide new resinous compositions that can be used to prepare improved coating compositions. It is a further object to provide new resinous compositions containing alcohol-soluble coating resins that can be used to give coatings having improved water resistance. It is a further object to provide new resinous compositions that give coatings having improved hardness and durability. It is a further object to provide new resinous compositions that give coatings having improved dry rate. It is a further object to provide new coatings having improved resistance to blushing and yellowing. It is a further object to provide new alcohol-soluble resin based coatings which are free of surface defects. These and other objects of the invention will be apparent from the following detailed description thereof.

It has now been discovered that these and other objects may be accomplished by the new compositions of the invention comprising a mixture of an alcohol soluble coating resin, and preferably shellac, and a new synthetic resinous polyol consisting of a copolymer of an ethylenically unsaturated monohydric alcohol and an alkenyl-substituted aromatic compound and/or a hydroxy-containing derivative of the said copolymer, such as, for example, an alkylene oxide adduct of the copolymer. It has been found that, unexpectedly, the above-noted new synthetic resinous polyols have surprising solubility in alcohol and can be combined with the alcohol soluble coating resins to form superior coating compositions. Coating compositions prepared from this special combination of resins, for example, have unexpectedly superior water resistance even though the resinous polyol additive contains a plurality of OH groups and would be expected to decrease the water resistance. In addition, the new compositions give coatings having faster drying rates than obtainable heretofore with the alcohol soluble resins. Furthermore, the new compositions, and particularly those containing shellac, have greatly improved gloss. The compositions, and particularly those prepared from shellac, Manilla gum, liquid polyamides and the like, also have unexpected improvement in hardness. Still further, the new resinous compositions give coatings which are free of blush or opaqueness which has been characteristic of many of the coatings from spirit soluble resins, such as nitrocellulose. Evidence of these and other superior properties of the new resinous compositions may be found in the working examples at the end of the specification.

The resinous polyols used in the preparation of the new compositions of the invention comprise the copolymers of ethylenically unsaturated monohydric alcohols and alkenyl-substituted aromatic compounds, and preferably those containing from 15% to 90% by weight of combined alkenyl-substituted aromatic compounds. The ethylenically unsaturated monohydric alcohols include, among others, allyl alcohol, chloroallyl alcohol, methallyl alcohol, beta-phenylallyl alcohol, and the like. Particularly preferred are the 2-alkenols containing from 3 to 8 carbon atoms.

The alkenyl-substituted aromatic compounds used in preparing the resinous copolymers include, among others, styrene, p-chlorostyrene, alpha-methylstyrene, p-methoxystyrene, p-butylstyrene, p-actylstyrene, vinyltoluene, 2,5-dibutylstyrene, beta-vinyl naphthalene, 2,4-dichlorostyrene and the like. Particularly preferred are styrene and the nuclear chloro- and alkyl-substituted styrene wherein the alkyl groups contain from 1 to 4 carbon atoms.

The resinous polyols are preferably prepared by heating a mixture of the unsaturated alcohol and the alkenyl-substituted aromatic compound at a temperature ranging from about 100° C. to about 250° C. in the presence of from about .1% to about 25% of a peroxide having a decomposition temperature in excess of 90° C., the quantity of the peroxide being based on the weight of the monomers.

The preferred procedure is to add the alkenyl-substituted aromatic compound in small increments during the course of the reaction. The addition is regulated so as to maintain the ratio of unreacted monomers substantially constant and thus permit the formation of a copolymer having uniform compositions.

The ratio in which the alcohol and the alkenyl-substitued aromatic compounds may be combined at the beginning of the reaction, and preferably maintained during the course of the reaction, may vary within wide limits. As the monomers differ in the rate of polymerization, ratio of unreacted monomers will differ from the ratio in which the monomers appear in the copolymer and it will be necessary to run a few preliminary determinations to establish the ratio of unreacted monomers to give a copolymer of the desired. If allyl alcohol and styrene are the monomers and the catalyst is di-tert-butyl peroxide at a temperature of about 120° C., the relation of the ratio of unreacted monomers to finished copolymer compositions may be illustrated by the following:

| Allyl Alcohol:Styrene, Moles Unreacted Monomer in Polymerization Mixture | Peroxide, Percent w. of Copolymer | Vinyl Aromatic, Percent w. in Copolymer |
|---|---|---|
| 10:1 | 3.5 | 82 |
| 20:1 | 7.2 | 69 |
| 30:1 | 9.9 | 60 |
| 900:1 | 23.7 | 13 |

The peroxides employed in the polymerization are preferably those that do not decompose below 90° C. Such peroxides includes ditertiary butyl peroxide, hydrogen peroxide, tertiary-butyl hydroperoxide, cumene hydroperoxide, paramenthane hydroperoxide, tertiary-butyl perbenzoate and the like.

As noted, the peroxide is preferably utilized in an amount varying from .1% to 25% by weight of the monomer, and preferably .1% to 10%. The exact amount used will depend on a number of considerations. One important consideration is the proportion of the unsaturated alcohol present as the polymerization proceeds, i.e., with higher concentration of the alcohol greater amounts of peroxide are required. This in turn is related to the desired composition of the copolymer as described above. Another important consideration is the temperature at which the copolymerization is conducted. As a generalization, it may be stated that at higher temperatures, e.g., in the order to 160°–180° C., the qauntity of the peroxide required is lower; at lower temperatures, i.e., in the order of 120°–130° C., the quantity of peroxide required is greater.

The temperature employed will vary depending upon factors such as desired reaction time, amount of peroxide and the molecular weight of the finished copolymer. In most cases, the temperatures employed will vary from about 100° C. to about 250° C. Temperatures within this range give satisfactory reaction rates, can be used with economical amounts of peroxide catalyst and give products having molecular weights within the desired range, e.g., from about 500 to about 8,000 and preferably between 700 and 3,000. These molecular weights are determined ebullioscopically in dichloroethane.

COPOLYMER A

To a pressure vessel equipped with an agitator, thermometer and suitable fixture for pumping liquids into the vessel under pressure, are charged 11,085 parts (191 moles) of allyl alcohol, 994 parts (9.6 moles) of styrene, stabilized with .005% of tertiary-butyl catechol, and 241.6 parts of ditertiary butyl peroxide. The temperature is raised to 135° C. and maintained at about this temperature for 5 hours. Over the 5 hour period, additional styrene is pumped into the reaction vessel so that at the end of the second hour about 490 parts; at the end of the third hour about 344 parts; at the end of the fourth hour about 242 parts; and at the end of the fifth hour about 160 parts. This styrene, likewise, contained tertiary-butyl catechol stabilizer. After the reaction is complete, the contents of the vessel are distilled to separate the unreacted monomers. The residue, at 23% conversion, is a brittle resin which is substantially colorless. It has a styrene content of about 70%, hydroxyl equivalent of .45/100 g., a molecular weight of about 1,300, a softening point (Durrans) of 95° C. and an acidity of less than .001 eq./100 g. This polymer will be referred to hereinafter as Copolymer A.

COPOLYMER B

The above process is repeated with the exception that the mol ratio of allyl alcohol to styrene is changed to about fifty to one. The resulting product is a brittle resin having a styrene content of about 40%, hydroxyl content of 0.750 eq./100 g. This product will be referred to herein as Copolymer B.

COPOLYMER C

The above process is repeated with the exception that the mol ratio of allyl alcohol to styrene is changed to about 10 to 1. The resulting product is a brittle resin having a styrene content of 85% and a hydroxyl value of 0.271 eq./100 g. This product will be referred to as Copolymer C.

COPOLYMER D

To a reaction vessel equipped as above are charged 270 parts of allyl alcohol, 549 parts of para-methylstyrene and 8.2 parts of ditertiary butyl peroxide. The temperature is raised to 185° C. and maintained at this temperature for several hours while the mixture is blanketed with nitrogen. During the first, third and fifth hours, respectively, 8.2 parts of ditertiary-butyl peroxide is added. When the reaction is complete the contents of the vessel are distilled at 155° C., at about 1 mm. Hg. The copolymer is a brittle resin having a mol weight of 470, a hydroxyl value of about 0.36 eq./100 g. and an acidity of less than 0.001 eq./100 g.

COPOLYMER E

A para-chlorostyrene-allyl alcohol copolymer is prepared using the same weight relationship as in the preceding example. The product is a clear, brittle solid having a high hydroxyl value.

In preparing the new polyols, a third or even fourth component may be included in the reaction mixture. This includes monomers having a $CH_2=C=$ group, such as butadiene, acrylic acid, acrylate esters, acrylonitrile, vinyl chloride and the like. Such monomers are preferably utilized in amounts of not more than 20% by weight of the total monomer mixture.

Modified polymers of the unsaturated alcohol and the alkenyl-substituted aromatic compounds may also be used in making the products of the present invention. This includes further reacting the polymers with alkylene oxides, such as propylene and ethylene oxides, or by including additional unsaturated components in the polymerization reaction medium during the formation of the polymer. In this latter case, the amount of the additional component preferably should not exceed 30% by weight of the copolymer.

The derivatives of these polyols which are particularly useful in making the new compositions are those obtained by further reacting all but two of the OH groups with other components, such as acids, anhydrides alkylene oxides, other alcohols and the like.

A preferred group of the hydroxy-containing derivatives of the resinous polyols include those obtained by reacting the resinous polyols with alkylene oxides, and preferably those containing 2 to 4 carbon atoms, such as ethylene oxide, propylene oxide and butylene oxide. These are prepared by merely passing the alkylene oxide into the resinous polyol or solution containing the polyol, preferably in the presence of catalyst, such as boron trifluoride complex as boron trifluoride ethyl etherate in amounts preferably varying from about .1% to 5% by weight. The preparation of two alkylene oxide adducts is illustrated below:

ETHYLENE OXIDE-POLYMER A ADDUCT 100 parts of Polymer A as described above was dissolved in chloroform and 1% of boron trifluoride ethyl etherate added thereto. 4 mols of ethylene oxide per hydroxy group in Polymer A was then bubbled into the reaction vessel. The mixture was heated at a temperature of 100° C. for several hours. The resulting product is a very viscous liquod having a hydroxy value of 0.26 eq./100 g.

PROPYLENE OXIDE-POLYMER A ADDUCT 100 parts of Polymer A as described above was dissolved in chloroform and 1% of boron trifluoride ethyl etherate added thereto. 4 mols of propylene oxide per hydroxy group in Polymer A was then introduced into the reaction vessel. The mixture was heated at a temperature of 100° C. for several hours. The resulting product is a very viscous liquid having a hydroxy value of 0.24 eq./100 g.

A preferred group of the hydroxy-containing derivatives of the resinous polyols include the hydroxy-containing polyesters obtained by reacting polybasic acids, such as phthalic acid, terephthalic acid, isophthalic acid, adipic acid, succinic acid, 1,20-eicosanedioic acid, 1,14-tetradecanedioic acid, cyclohexane-dicarboxylic acid, tetrachlorophthalic acid, maleic acid, and the like with a large excess of the resinous polyol, preferably in the presence of known esterification catalysts and preferably at temperatures ranging from about 25° C. to 100° C.

The other component to be used in preparing the resinous compositions of the invention includes the alcohol soluble coating resins. By alcohol soluble is meant those resins that are soluble in methanol, ethanol or isopropanol to the extent of at least 20 parts per 100 parts of alcohol. These resins may be synthetic or natural occurring, but a great majority of them are of the natural resin type. Examples of these resins include, among others, shellac, both bleached and unbleached, Manilla gum, cellulose ethers as ethyl cellulose, methyl cellulose, butyl cellulose, nitrocellulose, certain polyamide resins, protein resins as zein, polyvinyl acetate, polyvinyl formate, polyvinyl acetals and the like and mixtures thereof.

The quantities of the above materials to be used in producing the new compositions of the invention may vary over a wide range depending upon the nature of the components and the intended application. Valuable products are obtained when the amount of the resinous polyol employed varies from as little as 3 to 4% by weight of the combined weight of resinous polyol and alcohol soluble coating resin to as high as 95% by weight of the combined mixture. Preferably, the resinous polyol is employed in amounts varying from 10% to 80% by weight of the combined mixture.

The compositions may be prepared by merely bringing the two above described components together. This may be accomplished by mixing the two together without the use of solvents or with the aid of solvents or diluents. Preferred solvents include the spirit solvent as methanol, ethanol, isopropanol, butanol and the like, and mixtures of these materials with other inert diluents as xylene, toluene, benzene, cyclohexanone, cyclohexane, cyclopentane, isohexane, octane and the like. When using mixtures of diluents, it is preferred to utilize one containing at least 45% by weight of the lower alkanols, such as ethanol and isopropanol. It is also possible in preparing the compositions to fuse the two components together by use of heat.

The preparation of the compositions may be accomplished at any suitable temperature or pressure. In most cases, the mixing can be accomplished at room temperature, but in the case of fusing the components together, temperatures ranging from about 60° C. to 120° C. may be desirable.

The compositions of the invention may be used for a great variety of applications, such as in the preparation of inks and dyes, impregnating compositions, sealing compositions, paving compositions and in the preparation of special surface coating compositions, such as spirit varnishes, paints and lacquers.

When used in the preparation of surface coating compositions, they may be used as such or in combination with suitable solvents and diluents. In case the compositions contain the spirit solvents as utilized in their preparation as noted above, they may be used in this form directly or after the addition of further amount of solvents or diluents, such as paint and lacquer solvents and the like.

Other materials may also be added to the surface coating compositions without affecting their superior properties. This includes various dyes, pigments, fillers, anti-oxidants, stabilizers, plasticizers, driers and the like. It may also be desirable to add small quantities of other types of resinous products which will tend to lower the cost of the coating compositions, such as bituminous materials as tars and pitches, the presence of the resinuous polyols making it possible to combine such components in the coating without the formation of incompatible films.

The above-described coatings may be applied to any desired surface, such as metal, wood, plaster, plastic, cement, asphalt surfaces and the like. The application may be accomplished by any conventional procedure, such as by dipping, spraying, brushing and the like.

On contact with air the coatings dry rapidly to form hard films which are free from surface defects and blushing, have good water resistance, good durability and good gloss and good resistance to yellowing.

Valuable coatings are also obtained by combining the above-described resinous polyols with the following resins as by fusion (at ratios such as 1:9 to 1:1 and 9:1) and cooling: Coumarone resin, wood rosin, ester gum, rosin-modified phenolic, maleic resin, phenolic resin, coal tar and asphaltic fractions.

To illustrate the manner in which the invention may be carried out, the following examples are given. It is to be understood that the examples are for the purpose of illustration and the invention is not to be regarded as limited to any of the specific conditions or materials recited therein. Unless otherwise indicated, parts disclosed in examples are parts by weight.

*Example I*

This example illustrates the preparation of a coating composition from an allyl alcohol styrene copolymer having an OH value of 0.76 eq./100 g., and a molecular weight of 1300 and shellac.

50 parts of shellac and 50 parts of the allyl alcohol-styrene copolymer were dissolved in ethanol to form a 40% solution. The solution prepared in this manner was then spread on tin panels and allowed to air dry. In about 30 minutes, the coating had dried hard. The coating had excellent gloss, good hardness and had good resistance to solvents (e.g., mineral spirits) and good water resistance (e.g., one hour in cold-water—no effect).

*Example II*

Example I was repeated with the exception that the allyl alcohol-styrene copolymer and the shellac were combined in a weight ratio of 40–60. The resulting ethanol solution was spread on tin panels and allowed to dry. The coating dried hard in a few minutes to form films having good gloss and good solvent and water resistance.

*Example III*

This example illustrates the preparation of a coating composition from Copolymer A described above and shellac.

A series of experiments were conducted wherein shellac and Copolymer A were dissolved in ethanol in the proportions indicated in the table to form 40% solutions. The solutions were spread on tin panels and allowed to air dry. The coating dried in about 30 minutes to form hard coatings. The coatings had the properties shown in the following table in comparison to properties of shellac alone:

| Percent Shellac | 100 | 50 | 30 | 10. |
|---|---|---|---|---|
| Percent Polymer A | 0 | 50 | 70 | 90. |
| Gloss | Fair | Excellent | Excellent | Excellent. |
| Dry Time to Cotton-free state, minutes. | 77 | 19 | 20 | 18. |
| Hardness (Tukar Hardness test, Knoop No.). | 2.4 | 5.5 | 9.1 | 12.0. |
| Smoothness | Orange peel. | Smooth | Smooth | Smooth. |
| Film 3 days old, Immersed in Water 1 hr. | Mod.-Heavy Haze. | Very slight Haze. | No effect | No effect. |

Example IV

This example illustrates the preparation of a coating composition from a propylene oxide adduct of an allyl alcohol-styrene copolymer wherein the adduct has an OH value of 0.24 eq./100 g.

50 parts by weight of shellac and 50 parts by weight of the propylene oxide adduct were dissolved in ethanol to form a 40% solution. This solution was spread on tin panels and allowed to air dry. The coating dried in a short time to form a hard, flexible, and solvent resistant coating.

Example V

This example illustrates the preparation of a coating composition containing an allyl alcohol/styrene/butadiene copolymer having an OH value of 0.4 equivalence in a styrene content of about 40% shellac.

30 parts of shellac and 70 parts of the above-described copolymer are dissolved in ethanol to form a 40% solution. This solution is spread on tin panels and allowed to air dry. Resulting coating is hard and has good resistance to water.

Example VI

Example I was repeated with the exception that the shellac and resinuous polyol were combined in ratios varying from 10:90 to 90:10. In all cases, the resulting films dried rapidly to form hard water resistance coatings.

Example VII

This example illustrates the preparation of a coating composition from an allyl alcohol-styrene copolymer having a Durran's softening point of 97° C., mol wt. of 1150 and OH value of 0.45 eq./100 g.

10 parts of Manilla gum and 90 parts of the allyl alcohol-styrene copolymers were dissolved in ethanol to form a 40% solution. The solution prepared in this manner was spread on glass panels and tin panels and allowed to air dry. In about 30 minutes, the coatings had dried hard. The films were free of blush, had good water resistance and harder than films prepared without the allyl alcohol-styrene copolymer.

Example VIII

Example VII was repeated with the exception that the Manilla gum and allyl alcohol-styrene copolymers were combined in a ratio of 1:1 and 9:1. In both cases, hard, blush-free films were obtained.

Example IX

This example illustrates the preparation of a coating composition from an allyl alcohol-styrene copolymer as described in Example VII and ethyl cellulose.

10 parts of ethyl cellulose and 90 parts of the allyl alcohol-styrene copolymer were dissolved in isopropanol to form a 40% solution. The solution prepared in this manner was spread on glass panels and tin panels and allowed to air dry. In about 30 minutes, the coating had dried hard. The films were clear and had good water resistance.

Example X

Example IX was repeated with the exception that the ethyl cellulose and allyl alcohol-styrene copolymer were combined in a ratio of 1:1 and 9:1. In both cases, hard, blush-free water resistant films were obtained.

Example XI

This example illustrates the preparation of a coating composition from an allyl alcohol-styrene copolymer as described in Example VII and ½ second spirit soluble nitrocellulose.

10 parts of nitrocellulose and 90 parts of the allyl alcohol-styrene copolymer were dissolved in solvent made up of 2 parts ethanol and 1 part butyl acetate to form a 40% solution. The solution prepared in this manner was spread on glass panels and tin panels and allowed to air dry. In about 30 minutes, the coating had dried hard. The films were free of blush, had good water resistance and good durability.

Example XII

Example XI was repeated with the exception that the nitrocellulose and allyl alcohol-styrene copolymer were combined in a ratio of 1:1 and 9:1. In both cases, hard, blush-free water resistant films were obtained.

Example XIII

This example illustrates the preparation of a coating composition from an allyl alcohol-styrene copolymer and zein as in Example VII.

90 parts of zein and 10 parts of an allyl alcohol-styrene copolymer containing about 75% styrene were dissolved in a solvent made up of 91% isopropyl alcohol and 9% water to form a 40% solution. The solution was then spread on glass panels and tin panels and allowed to air dry. In about 30 minutes, the coatings had dried hard. The films were clear, hard and tough.

Example XIV 10 parts of polyamide resin (Versamid 115 polymers DTA dimerized fatty acid) and 90 parts of an allyl alcohol-styrene copolymer was dissolved in ethanol and cast on glass and tin panels. The product dried to a completely dried film whereas the polyamide resin alone remains tacky. The film is clear and hard and water-resistant.

Example XV

This example illustrates the preparation of a coating composition from a propylene oxide adduct of an allyl alcohol-styrene copolymer as defined in Example IV and ethyl cellulose.

50 parts of ethyl cellulose and 50 parts of the propylene oxide adduct as in Example IV were combined in isopropanol to form a 40% solution. This solution was spread on glass and tin panels and allowed to air dry. The coating dried rapidly to form a hard, water resistant durable coating.

Example XVII

Example XVI was repeated with the exception that the propylene oxide adduct and the copolymer were combined in a ratio of 10 to 90. In both cases, hard water resistant durable films were obtained.

Example XVIII

This example illustrates the preparation of a coating composition from a propylene oxide adduct of an allyl alcohol-styrene copolymer as in Example IV and polyvinyl acetate.

90 parts of polyvinyl acetate having an intrinsic viscosity of 0.15 in cyclohexanone and 10 parts of the propylene oxide adduct were combined in ethanol to form a 20% solution. This solution was spread on glass and tin panels and allowed to dry. The coating dried rapidly to form a hard, flexible water resistant durable coating.

Example XIX

This example illustrates the preparation of a coating composition from a propylene oxide adduct of an allyl alcohol-styrene copolymer and Manilla gum.

50 parts of Manilla gum and 50 parts of the propylene oxide adduct were dissolved in ethanol to form a 40% solution. The solution prepared in this manner was spread on glass panels and tin panels and allowed to air dry. In about 30 minutes, the coatings had dried hard. The films were free of blush, had good water resistance and flexibility and good durability.

*Example XX*

Example XIX was repeated with the exception that the adduct and the Manilla gum were combined in a ratio of 10 to 90. In this case, hard blush-free water resistant films were obtained.

*Example XXI*

50 parts of a vinyl chloride-vinyl acetate copolymer (VAGH) having an intrinsic viscosity in cyclohexane of 0.57 was combined with 50 parts of the propylene oxide adduct of an allyl alcohol-styrene copolymer as described in Example IV to form a 40% solution in methyl isobutyl ketone. The solution was spread on glass and tin panels and dried in air. The resulting coating was a clear flexible film having good water resistance.

*Example XXII*

Examples I to XIII are repeated with the exception that the copolymer employed is a copolymer of allyl alcohol and p-methyl-styrene. Similar results are obtained.

*Example XXIII*

Examples I to XIII are repeated with the exception that the copolymer employed is a copolymer of methallyl alcohol and styrene having an OH value of 0.5 eq./100 g. Similar results are obtained.

We claim as our invention:

1. A composition consisting of (1) a coating resin having at least 20% solubility in ethanol and selected from the group consisting of shellac, Manilla gum, cellulose ethers, nitrocellulose, liquid polyamides of dimerized fatty acids and diethylene triamine, zein, polyvinyl acetate, polyvinyl formate and polyvinyl acetals, and mixtures thereof, and (2) a resinous polyol of the group consisting of copolymers of a 2-alkenol containing from 3 to 8 carbon atoms and an alkenyl-substituted aromatic compound of the group consisting of the individual compound styrene, alpha-methylstyrene, p-methoxystyrene, and beta-vinyl naphthalene, and the nuclear chloro- and alkyl-substituted styrenes wherein the alkyl group contains from 1 to 4 carbon atoms, and hydroxy-containing derivatives of the aforedescribed copolymers obtained by reacting the copolymer with an alkylene oxide.

2. A composition consisting of (1) a solvent containing an alcohol of the group consisting of methanol, ethanol and isopropanol, (2) a coating resin having at least 20% solubility in ethanol and selected from the group consisting of shellac, Manilla gum, cellulose ethers, nitrocellulose, liquid polyamides of dimerized fatty acids and diethylene triamine, zein, polyvinyl acetate, polyvinyl formate and polyvinyl acetals, and mixtures thereof, and (3) a copolymer of allyl alcohol and a member of the group consisting of the individual compound styrene, alpha-methylstyrene, p-methoxystyrene and beta-vinyl naphthalene, and the nuclear chloro- and alkyl-substituted styrenes wherein the alkyl groups contain 1 to 4 carbon atoms, the said copolymer being present in an amount varying from 3% to 95% by weight of the combined mixture.

3. A composition as in claim 1 wherein the resinous polyol is a copolymer of allyl alcohol and the individual compound styrene.

4. A composition as in claim 1 wherein the resinous polyol is an adduct of an alkylene oxide and a copolymer of an allyl alcohol and the individual compound styrene.

5. A composition as in claim 1 wherein the alcohol soluble coating resin is Manilla gum.

6. A composition as in claim 1 wherein the coating resin is ethyl cellulose.

7. A composition as in claim 1 wherein the coating resin is ½ second spirit soluble nitrocellulose.

8. A composition as in claim 2 wherein the resinous polyol is a copolymer of allyl alcohol and the individual compound styrene containing at least three OH groups and having a molecular weight between 300 and 3,000.

9. A composition consisting of an ethanol solution of a mixture comprising shellac and at least 3% by weight of the combined mixture of a resinous copolymer of allyl alcohol, the individual compound styrene and butadiene.

10. A surface coating composition consisting of an ethanol solution containing shellac and 3% to 95% by weight of the combined mixture of a copolymer of allyl alcohol and the individual compound styrene having a hydroxy value between 0.4 and 0.8 eq./100 g.

11. A composition consisting of about 90 parts of zein and 10 parts of a copolymer of allyl alcohol and the individual compound styrene.

12. A composition consisting of about 90 parts of polyvinyl acetate and 10 part of a copolymer of allyl alcohol and the individual compound styrene.

References Cited in the file of this patent

UNITED STATES PATENTS

| | | |
|---|---|---|
| 2,521,078 | Meyer | Sept. 5, 1950 |
| 2,897,174 | Chapin et al. | July 28, 1959 |
| 2,899,404 | Chapin et al. | Aug. 11, 1959 |
| 2,940,946 | Shokal et al. | June 14, 1960 |